United States Patent
Donley et al.

(10) Patent No.: US 8,245,032 B2
(45) Date of Patent: Aug. 14, 2012

(54) METHOD TO AUTHENTICATE PACKET PAYLOADS

(75) Inventors: Christopher J. Donley, Broomfield, CO (US); Robert R. Gilman, Broomfield, CO (US); Kurt H. Haserodt, Westminster, CO (US); John M. Walton, Spearfish, SD (US)

(73) Assignee: Avaya Inc., Basking Ridge, NJ (US)

( * ) Notice: Subject to any disclaimer, the term of this patent is extended or adjusted under 35 U.S.C. 154(b) by 2389 days.

(21) Appl. No.: 10/401,919

(22) Filed: Mar. 27, 2003

(65) Prior Publication Data

US 2004/0193876 A1 Sep. 30, 2004

(51) Int. Cl.
*H04L 29/06* (2006.01)
*H04L 9/32* (2006.01)
(52) U.S. Cl. ........ 713/160; 713/151; 713/161; 713/170
(58) Field of Classification Search ................. 713/162, 713/153, 189, 151, 160, 161, 170
See application file for complete search history.

(56) References Cited

U.S. PATENT DOCUMENTS

| | | | | |
|---|---|---|---|---|
| 6,185,680 | B1 * | 2/2001 | Shimbo et al. | 713/160 |
| 6,279,140 | B1 * | 8/2001 | Slane | 714/807 |
| 6,424,714 | B1 * | 7/2002 | Wasilewski et al. | 380/200 |
| 6,519,636 | B2 * | 2/2003 | Engel et al. | 709/223 |
| 6,782,474 | B1 * | 8/2004 | Ylonen | 713/162 |
| 6,795,917 | B1 * | 9/2004 | Ylonen | 713/160 |
| 6,920,556 | B2 * | 7/2005 | Kuehr-McLaren et al. | 713/151 |
| 6,957,346 | B1 * | 10/2005 | Kivinen et al. | 713/153 |
| 7,069,436 | B1 * | 6/2006 | Akachi | 713/162 |
| 2001/0023482 | A1 * | 9/2001 | Wray | 713/151 |
| 2002/0035681 | A1 * | 3/2002 | Maturana et al. | 713/151 |
| 2002/0040432 | A1 * | 4/2002 | Gao | 713/170 |
| 2003/0004688 | A1 * | 1/2003 | Gupta et al. | 702/188 |
| 2003/0005144 | A1 | 1/2003 | Barzilai et al. | |
| 2003/0021417 | A1 * | 1/2003 | Vasic et al. | 380/277 |

FOREIGN PATENT DOCUMENTS

| | | |
|---|---|---|
| JP | 2002-501332 | 1/2002 |
| WO | WO 99/35799 A1 | 7/1999 |
| WO | WO 9935799 A2 * | 7/1999 |
| WO | WO 00/78008 A | 12/2000 |
| WO | WO 0089009 A1 | 12/2000 |

OTHER PUBLICATIONS

Avaya 4600 Series IP Telephones Key Features, printed Nov. 21, 2002, available at http://www.avaya.com/ac/common/index.jhtml?location=M1H1005G1011F2052P3125N4862.
Avaya IP Softphone Product Summary, printed Nov. 21, 2002, available at http://www.avaya.com/ac/common/index.jhtml?location=M1H1005G1011F2052P3126N4872.

(Continued)

*Primary Examiner* — Mohammad W Reza
(74) *Attorney, Agent, or Firm* — Sheridan Ross P.C.

(57) ABSTRACT

An architecture for authenticating packets is provided that includes: an input 322 operable to receive a packet, the packet comprising at least one of a transport, session and presentation header portion and a transport agent 312 operable to compute a first message authentication code based on at least some of the contents of the packet and compare the first message authentication code with a second message authentication code in the at least one of a transport, session, and presentation header portion to authenticate the packet.

42 Claims, 8 Drawing Sheets

OTHER PUBLICATIONS

"Sample Avaya™ G700 Media Gateway Controlled by Avaya™ S8300 Media Server Configuration—Issue 1.0" (2002), 16 pages.
Avaya Communication, "Voice Over IP Via Virtual Private Networks: An Overview" (Feb. 2001), 9 pages.
Examination Report for European Patent Application No. 04251788.0 dated Mar. 4, 2005, 6 pages.
European Search Report for European Application No. 04251768.0 dated Sep. 7, 2004.
A. Heffernan, "Request for Comments: 3585," Cisco Systems Network Working Group (Aug. 1998), 7 pages.
Further Examination Report for corresponding European Patent Application No. 04251768.0 dated Sep. 13, 2006, 3 pages.
Examiner's Report for Canadian Patent Application No. 2,454,990 dated Oct. 4, 2006, 3 pages.
Floyd et al., "Random Early Detection Gateways for Congestion Avoidance", IEEE/ACM Transaction on Networking, Aug. 1993, 22 pages.
ITU, "Packet-based multimedia communications systems", H. 323, Feb. 1998, 125 pages.
Baker (Editor), "Requirements for IP Version 4 Routers", RFC 1812, Jun. 1995, 169 pages.
Braden et al. "Resource ReSerVation Protocol (RSVP)", RFC 2205, Sep. 1997, 6 pages.
Wroclawski, "The use of RSVP with IETF Integrated Services", RFC 2210, Sep. 1997, 30 pages.
Nichols et al., "Definition of the Differentiated Services Field (DS Field) in the Ipv4 and Ipv6 Headers", RFC 2474, Dec. 1998, 18 pages.
Blake et al. "An Architecture for Differentiated Services", RFC 2475, Dec. 1998, 33 pages.
Handley et al., "SIP: Session Initiation Protocol", RFC 2543, Mar. 1999, 143 pages.
Herzog et al., "COPS Usage for RSVP", RFC 2749, Jan. 2000, 16 pages.
Bernet, "Format of the RSVP DCLASS Object", RFC 2996, Nov. 2000, 9 pages.
Bernet et al., "Specification of the Null Service Type", RFC 2997, Nov. 2000, 11 pages.
Berney et al., "A Framework for Integrated Services Operation over Diffserv Networks", RFC 2998, Nov. 2000, 29 pages.
Chan et al., "COPS Usage for Policy Provisioning (COPS-PR)", RFC 3084, Mar. 2001, 31 pages.
McCloghrie et al., "Structure of Policy Provisioning Information (SPPI)", RFC 3159, Aug. 2001, 26 pages.
"Memo concerning The Official Action Reported in the Covering Letter" for Mexican Patent Application No. PA/a/2004/000800, Jun. 2007.
Examiner's Office Letter (including translation) for Japanese Patent Application No. 2004-91213, mailed Mar. 19, 2008.
Examiner's Report for Canadian Patent Application No. 2,454,990 dated Sep. 27, 2007.
First Office Action (including translation) for Chinese Patent Application No. 200410031300.2, mailed Jul. 4, 2008.
Examiner's Report for Canadian Patent Application No. 2,454,990 dated Nov. 6, 2008.
Examiner's Refusal Decision (including translation) for Japanese Patent Application No. 2004-91213, mailed May 7, 2009.
Notice of Allowance for Canadian Patent Application No. 2,454,990 dated May 14, 2009.

* cited by examiner

METHOD TO AUTHENTICATE PACKET PAYLOADS

FIELD OF THE INVENTION

The present invention relates generally to authentication and specifically to authentication of packet payloads.

BACKGROUND OF THE INVENTION

The need for effective network security is growing in importance each year due to an increasing occurrence and sophistication of computer hacking, viruses, and other types of network attacks. Electronic commerce has introduced a new type of network attack known as a Denial-of-Service or DoS attack. In a DoS attack, it is possible for a malicious third party to inject or "fold" a false packet into the packet stream when using the standard Transmission Control Protocol or TCP to provide sequenced transmission of data between two applications. To escape detection by secure protocols riding above TCP (e.g., Secure Sockets Layer or SSL or Transport Layer Security or TLS), the false packet is well formed in that it includes a correct address pair and sequence number (so that the packet appears to be valid) but includes spurious data. When the correct packet later arrives, the packet is discarded as a retransmitted duplicate. Because the spurious packet fails to authenticate successfully, the secure protocols terminate the session by sending an error message to the sending node. The secure protocols have no way to request, selectively, a retransmission of the discarded (correct) data. Consequently, the DoS attack necessitates a reestablishment of the TLS connection through a long cryptographic negotiation session, which requires significant processing resources. DoS attacks not only needlessly consume processing resources but also cost electronic commerce businesses millions each year in lost revenue.

One approach employed to defeat DoS attacks is to use IP Security or IPSec protocols in the transport mode to authenticate each IP packet. IPSec is able to encrypt not only the actual user data or payload but also many of the protocol stack informational items that may be used to compromise a customer site in a technical session attack profile. IPSec operates as a "shim" between layer 3 (Internet Protocol on "IP") and layer 4 (TCP or UDP) of the Open Systems Interconnect or OSI Architecture and includes a suite of protocols, which collectively provide for an Authentication Header (AH), an Encapsulating Security Payload (ESP), and the Internet Key Exchange (IKE). IPSec provides address authentication via AH, data encryption via ESP, and automated key exchanges between sender and receiver nodes using IKE.

FIG. 2A shows an IPv4 packet 200 with an authentication header 204. The authentication header 204 includes a next header field 208 (which is one byte long and identifies the higher level protocol that follows the AH), the payload length field 212 (which is one byte long and specifies the length of the Authentication data field 216), the Reserved field 220 (which is two byte field reserved for future use), the Security Parameters Index or SPI field 224 (which is four bytes long and identifies the security protocols being used in the packet), the sequence number field 228 (which is four bytes long and serves as a counter that identifies the number of IP AH packets it has already received that bear the same destination and SPI data), and the authentication data field 216 (which is of variable length and contains the Integrity Check Value or ICV (which is a digital signature of a packet generated using, for example, DES, MD5, or the Secure Hash Algorithm (SHA-1))).

FIG. 2B shows an IPv4 packet 250 with an Encapsulating Security Payload or ESP header 254. The encapsulating security payload header includes the SPI and sequence number fields 224 and 228 discussed above, the TCP or User Datagram Protocol (UDP) header 230, the payload data field 258 (which contains the encrypted version of the user's original data), the padding field 262 (which provides for any necessary padding requirements of the encryption algorithm or for byte-boundary alignments), the pad length field 266, (which specifies the number of pad bytes used in the padding field), the next header field 270 (which references the payload data by identifying the type of data contained in the payload data field), and authentication data 274 (which is a digital signature applied to the entire ESP header).

IPSec, however, is unable to pass through firewalls, particularly proxy server firewalls that perform network-address translation or network-address-and-port translations. This problem will be discussed with reference to FIG. 1. Referring to FIG. 1, a firewall (or proxy server) 100 is positioned between a network 104 and various firewall-protected network nodes 108a-n. Each node 108a-n has a corresponding IP address and port number. When a node 108a-n sends a packet out to the network, the firewall may change the IP address only or both the IP address and port number. The new IP address is typically the IP address of a proxy server. Because IPSec operates at layers 3 and 4 and IPSec does not have a facility for port specification, the proxy server's attempt to change the port fails and the packet is not transmitted. The ESP header 254 typically allows IP addresses but not port numbers to be changed. The AH 204, on the other hand, does not typically permit either IP addresses or port numbers to be changed.

SUMMARY OF THE INVENTION

These and other needs are addressed by the various embodiments and configurations of the present invention. The present invention is directed to a method for authenticating packets at a layer below the application layer, such as at the OSI transport and TCP/IP host-to-host transport layers.

In one embodiment of the present invention, a method for authenticating a packet is provided that includes the steps of:

(a) receiving a packet, the packet comprising a header and a payload and the header comprising a transport header portion;

(b) computing a first message authentication code based on at least some of the contents of the packet; and (c) comparing the first message authentication code with a second message authentication code in the transport header portion to authenticate the packet.

The transport header portion can be defined by any suitable software model, such as the OSI transport layer and the TCP/IP host-to-host transport layer.

The message authentication codes can be computed using any suitable algorithm is, such as a (secure) hash algorithm. The first and second authentication codes are typically truncated to a predetermined number of bits.

The first and second message authentication codes can be based on all or selected portions of the header and/or all or selected portions of the payload. The first and second message authentication codes are typically determined based at least on the transport header portion.

In one configuration, the first and second authentication codes are computed based on a pseudo-header in which the source and/or destination port fields is/are set to a value different than a corresponding source or destination port field in the header. Stated another way, the source and/or destination fields has/have a value independent of the corresponding source and destination field in the header. For example, the source and/or destination fields is/are set to zero. Fields in the packet which are not manipulated by the firewall are not normally set to a different value or ignored in the pseudo-header.

In another embodiment which may be used with the previous embodiment, the present invention is directed to an authentication method for received packets including the steps of:

(a) in a first mode, discarding the packet when the header does not include a valid authentication option, the authentication option including the second message authentication code; and (b) in a second, different mode, discarding the packet when the header includes an authentication option. The computing and comparing steps of the prior embodiment occur only in the first mode. The operational mode is typically determined by a higher layer, such as the application layer or session layer, or by the transport layer itself.

In yet another embodiment which may be used with either of the previous embodiments, the present invention is directed to an authentication method for packets to be transmitted including the steps of:

(a) assembling a packet comprising a header and a payload, the header including a transport header portion, wherein (b) in a first mode, including in the transport header portion a valid authentication option field; and (c) in a second, different mode, not including in the a transport header portion a valid authentication option field; and (d) thereafter transmitting the packet.

The various embodiments can have a number of advantages relative to the prior art. For example, the inclusion of an authentication option in a transport portion of the header can be an effective block to unauthorized manipulation of data in transit and provide increased resistance to destruction of a session caused by third-party injection of unauthenticated data, such as in the case of DoS attacks. When a packet is generated, a message authentication code is computed and inserted into the header. When the packet is received, it is verified against the enclosed message authentication code. When the verification fails, the packet has evidently been modified (or spuriously injected into the stream), and is therefore discarded without acknowledgment. Authenticate or unacknowledged packets will be retransmitted by the sender. The message authentication code can be defined in such a way that the packets flow through address and/or port translation firewalls without the need to disclose the secret in the packet to the firewall. According to one such definition, the source and/or destination port fields and any other field manipulated or altered by a proxy server-type firewall are set to a value other than the value in the header, such as zero, or ignored altogether in a pseudo-header upon which the message authentication code is based. The shared secret or secret key used to compute the message authentication code is supplied by the protocol layer above the transport layer. Hence, provision is made to permit the use of the transport layer in the unauthenticated mode to negotiate such a shared secret. Upon completion of the negotiation, transport layer authentication can be activated in order that all following packeted information is authenticated. In this manner, the present invention makes maximum use of existing protocols, such as TLS and TCP, without requiring the expense of alternative solutions or the creation of new protocols.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 3:
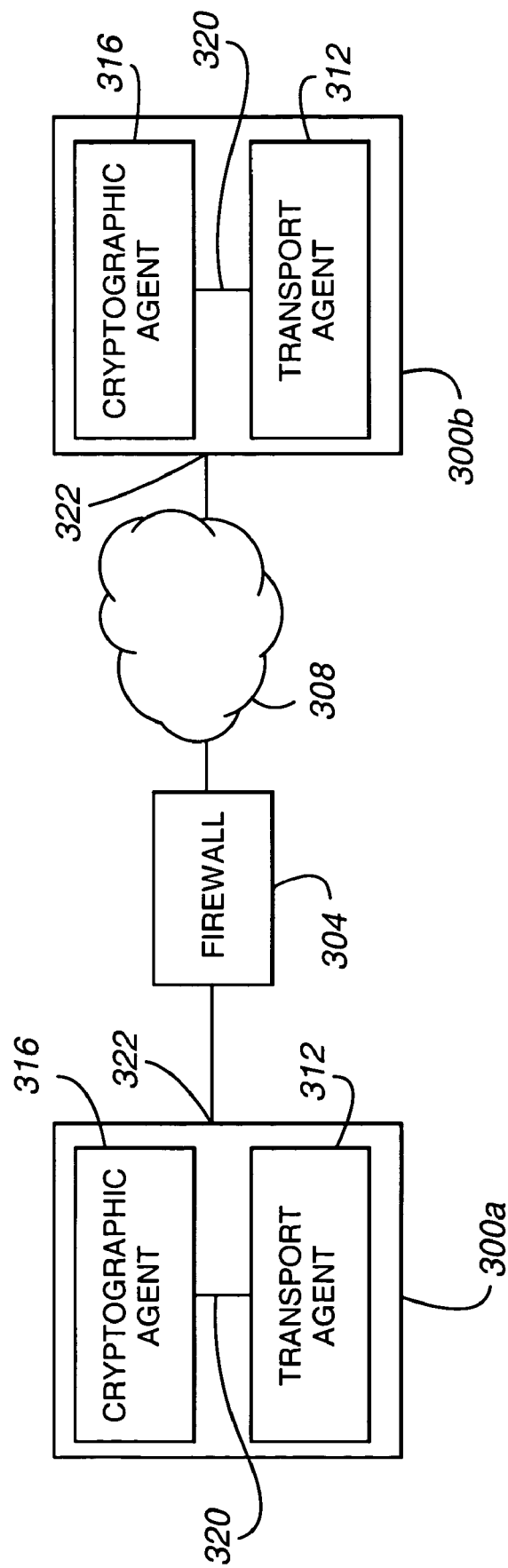
FIG. 3 is a block diagram of a proxy server-type firewall according to an embodiment of the present invention.

FIG. 3 depicts an architecture according to a first embodiment of the present invention. The architecture includes at least first and second endpoints or nodes 300a,b and a firewall 304 and network 308 positioned between the nodes 300a,b.

The first and second nodes 300a,b can be any computational component, such as a Personal Computer or PC, a server, a laptop, a Personal Digital Assistant or PDA, an IP telephone, a VoIP media gateway, an H.323 gatekeeper, and the like. Each node includes a transport agent 312 and a cryptographic agent 316, and an input or interface 322.

The transport agent 312 (a) provides for error-free delivery of data, (b) accepts data from an adjacent higher layer, such as the Session Layer or Layer 5 of the OSI or application layer of TCP/IP, partitions the data into smaller packets if necessary, passes the packets to an adjacent lower layer, such as the Network Layer or Layer 3 of the OSI or Internet layer of TCP/IP, and verifies that packets arrive completely and correctly at their destination, and (c) authenticates selected contents of a packet.

The cryptographic agent 316 includes protocols, such as Secure Sockets Layer or SSL (for security) and/or Transport Layer Security or TLS (for security) (often referred to collectively as "SSL/TLS"), Common Management Protocol or CMIP (for network management), File Transfer, Access, and Management (for remote file handling), X.400 (for e-mail), and/or SASL that define specific user-oriented application services and procedures.

The cryptographic agent 316 can operate in any application of an OSI service-oriented layer (e.g., Layers 5, 6, and/or 7) or in the application layer of TCP/IP.

A socket 320 represents the interface between the authentication and transport agents.

Figure 1:
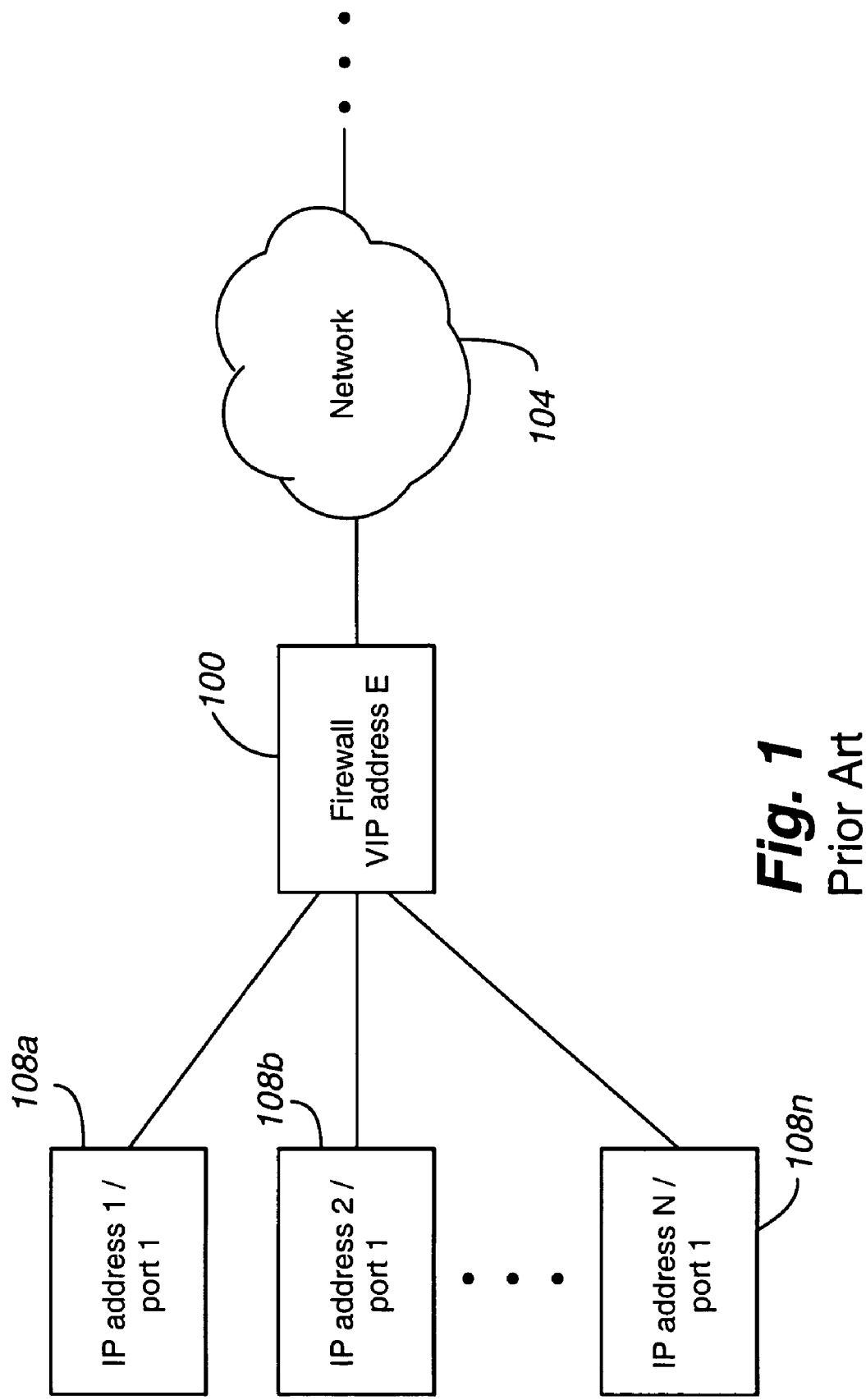
FIG. 1 is a block diagram of a conventional proxy server-type firewall.
Figure 2A:
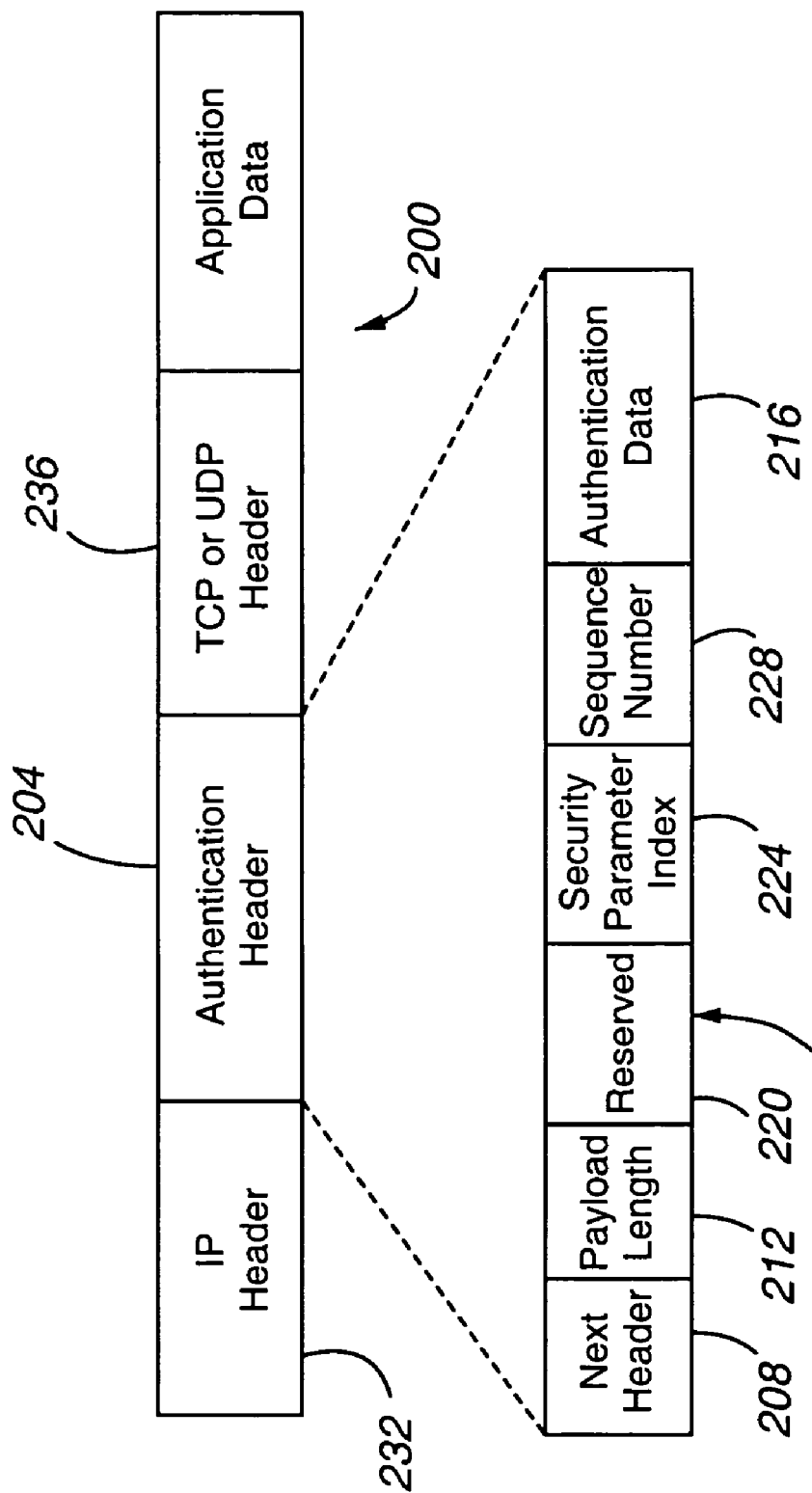
FIG. 2A is a block diagram of a conventional packet and authentication header.
Figure 2B:
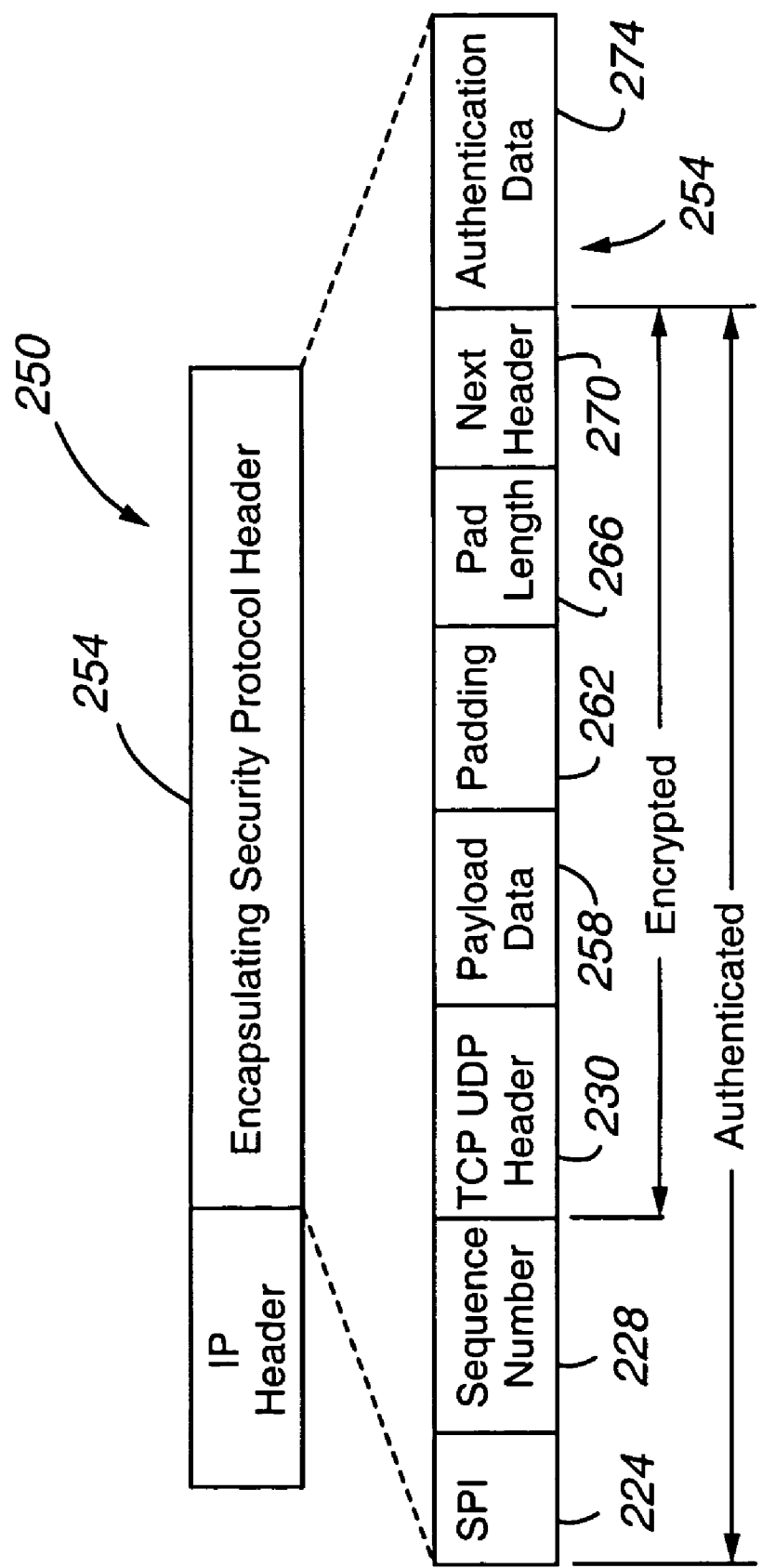
FIG. 2B is a block diagram of a conventional packet and encapsulating security protocol header.

As will appreciated, the OSI layering process begins at the application layer or Layer 7 of the source machine where a message is created by an application program. The message moves down through the layers until it reaches Layer 1. Layer 1 is the actual physical communication medium. The packeted data is then transmitted across this medium to the receiving host machine, where the information works its way up through the layers from Layer 1 to Layer 7. As a message moves down through the layers at the source machine, the message is encapsulated with headers, such as IP Header 232, AH 204, TCP or UDP header 236, or ESPH 254 (FIGS. 2A and 2B), that are germane to the specific layer. As the message moves up through the layers at the host machine, a header is removed by each respective layer. The TCP/IP layers work in much the same manner.

Firewall 304 can be any suitable type of firewall. For example, the firewall can be a frame-filtering firewall, a packet-filtering firewall, a circuit gateway firewall, stateful firewall, or application gateway or proxy server firewall.

Network 308 can be any distributed processing network whether digital or analog, such as the Internet.

Figure 4:
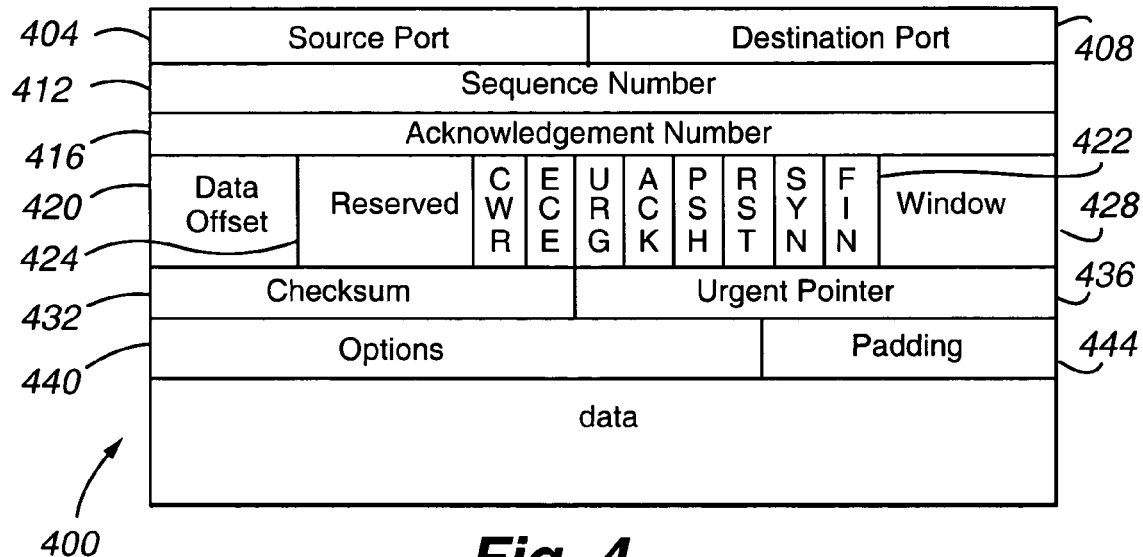
FIG. 4 is a block diagram of a conventional transport layer header according to the Transmission Control Protocol.

The TCP header used for authentication by the transport agent 312 will now be described with reference to FIGS. 4-6. FIG. 4 depicts a prior art format for the TCP header 400. The TCP header 400 includes fields for: source port 404, destination port 408, packet sequence number 412 (discussed above), byte acknowledgment number 416 (which indicates the last byte number received and accepted before an acknowledgment is sent), data offset 420 (which indicates the location of the start of data in the packet), flag field 422, reserved 424, window 428 (which indicates the number of bytes that can be received and buffered), checksum 432, urgent pointer 436 (which indicates the presence of urgent data in the packet), options 440 (which includes various options associated with the protocol), and padding 444 (a variable length field to pad the option field with enough zero bits to ensure that the header is of a desired length). According to the present invention, the authentication of a TCP Packet Data Unit ("PDU") or packet is enabled by including an authentication option in the options field 440. As will be appreciated, an option in the options field can have one of two forms, namely either a single octet of value option-kind or an octet of option-kind, followed by an octet of option-length, followed by (option length-2) octets of option-data. In one configuration, the authentication option is of the second form.

Figure 5:
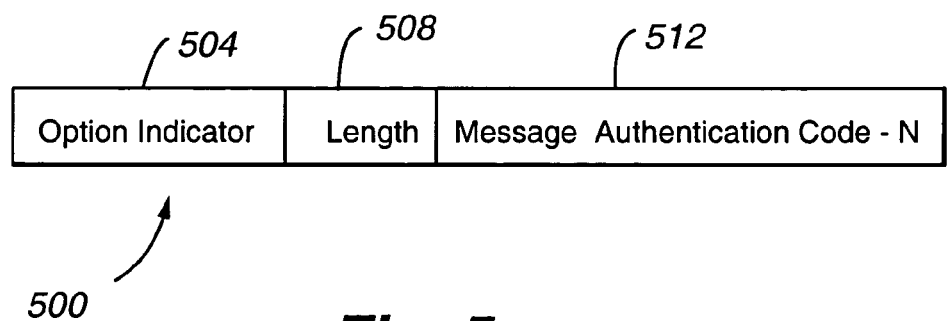
FIG. 5 is a block diagram of an authentication TCP option field according to the present invention.

FIG. 5 depicts an authentication option of the second form. The authentication option 500 includes the following fields, namely option indicator 504, length 508, and Message Authentication Code 512. The option indicator field 504 is the assigned option number bit or/value for the packet authentication option, the length field 508 is the length of the Message Authentication Code or MAC, and the Message Authentication Code 512 field contains the Message Authentication Code itself The MAC can be computed by any technique, including keyed hashed message authentication codes such as the HMAC-MD5 and HMAC-SHA1 algorithms, with truncation to N bits, denoted HMAC-SHA1-N and HMAC-MD5-N, respectively. Other supported message authentication codes include any keyed, cryptographically secure MAC, such as those based on cipher-feedback encryption. These codes are also preferably truncated to N bits. Truncation of the hashed message authentication code hinders an attacker from deciphering the hashing key information. The key used to generate the codes is received from the cryptographic agent.

The computation of the MAC will be discussed with reference to FIG. 6. Computation of the MAC may be performed over all or part of the TCP header and payload, with selected fields set to zero (or to zero bits). In FIG. 6, the MAC is performed over a pseudo-header 600 representing the entire TCP header and payload, with the source port field 604, destination port field 608, and checksum field 612 in the pseudo-header each set to zero (or zero bits) and the body of the packet. Thus, the source and destination ports and the checksum that covers them, which can be manipulated by certain types of firewalls, are excluded from the MAC computation. This permits the TCP header to be manipulated in the conventional way, without affecting authentication when passing through an address- or address-and-port-translating firewall.

Fields in the packet which are not manipulated by the firewall, such as the urgent pointer flag (which indicates that the urgent pointer field is significant), the PSH flag (which indicates data should be pushed to the using layer), the finished flag, the acknowledgment flag, the "syn" flag (which indicates that synchronized sequence numbers should be sent), the RST flag (reset connection), the sequence number, acknowledgment number, data offset, window, options, padding, are not set to a different value. Generally, the acknowledgment field and ack field must be covered by authentication (along with other flags).

As will be appreciated, one or more of the source port field 604, destination port field 608, and checksum field 612 in the pseudo-header 600 can be set to a nonzero value depending on the application. In computing the MAC, the source and destination port fields 604 and 608 should each be maintained constant by each node on either side of the firewall 304 to avoid inconsistencies in determining the MAC. Typically, the value in each of the fields is different from and independent of the addresses of the firewall 304 and first and second nodes 300*a,b*. For example, packets being transmitted from the first node to the second node should have the source port field set to a constant value in the pseudo-header 600 while packets being transmitted from the second node to the first node should have the destination port field set to a constant value in the pseudo-header 600 to avoid complications from port translation by the firewall 304.

The authentication option 500 (FIG. 5) is included in options field of the pseudo-header. Though not required as it is not altered by the firewall, the option-data field is the proper length but typically is set to all zeros (or zero bits). The standard TCP checksum is computed using the actual header.

The cryptographic agent 316 activates authentication on either or both directions of a TCP connection by providing the choice of algorithm(s) and keying material(s) for the algorithm. Once activated by the transmitting cryptographic agent 316, all transmitted packets must contain a valid authentication option 500, and, when not activated by the transmitting cryptographic agent, no generated TCP headers may contain an authentication option 500. If authentication is activated by the receiving cryptographic agent 316, all received packets must contain a valid authentication option 500, and the MAC contained therein must match the received packet, as noted above, or the packet is deemed by the transport agent 312 to be invalid. When authentication is activated by the receiving cryptographic agent 316, any packet that does not pass authentication or does not include a valid authentication option 500, is treated by the transport agent 312 in the same way as packets with invalid checksums. An authentication error may be logged or counted by the transport agent 312, and the log/count may be made available by the transport agent 312 to the cryptographic agent 316 or use layer upon request. Any received data that has not been reported by the transport agent 312 to the cryptographic agent 316 is discarded (and the receive sequence number is correspondingly not advanced), under the presumption that the cryptographic agent 316 would have coordinated the activation, hence this data must have been injected by an attacker or damaged in transit. When authentication is not activated by the receiving cryptographic agent 316, all packets with an authentication option 500 are discarded. This is so because the transmitting cryptographic agent 316 clearly expects to have the packet authenticated but the receiving cryptographic agent 312 may not yet have supplied the necessary authentication parameters with which to do so.

The operation of the transport and cryptographic agents 312 and 316 will now be described with reference to FIGS. 7 and 8.

Figure 7:
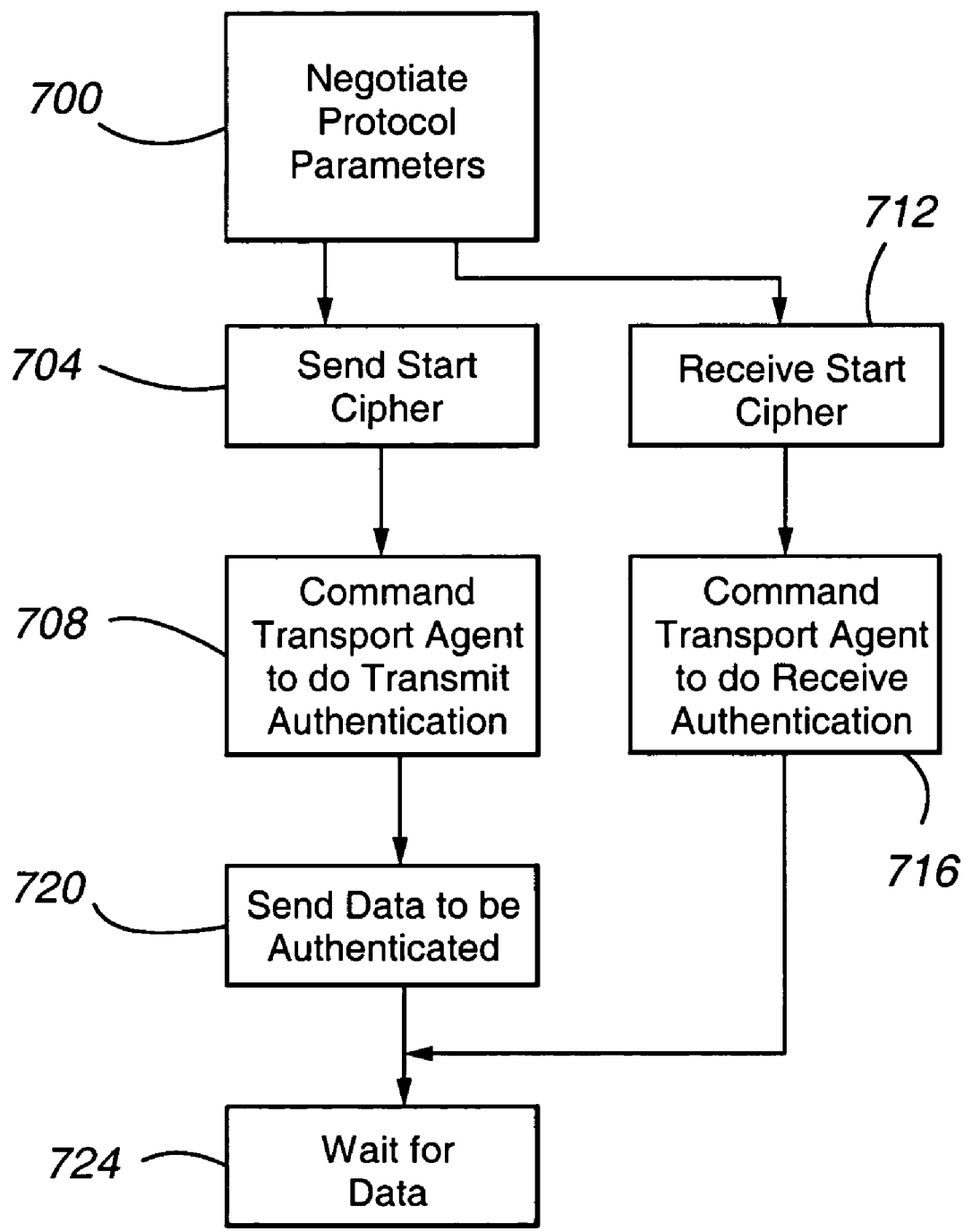
FIG. 7 is a flow chart depicting operation of the cryptographic agent.

FIG. 7 depicts the operations performed by the cryptographic agents in each node. In step 700 of FIG. 7, the cryptographic agent 316 of first node 300a and second node 300b negotiate protocol parameters over an insecure channel using conventional techniques. Typically, negotiation involves each party exchanging keys and, in some cases, digital certificates. A shared master key is computed from the exchanged keys. When the hashes in the finished messages exchanged by the first and second nodes agree, negotiation is completed. Typically, the exchange is validated at the cryptographic agent level by way of digital signatures.

Upon completion of negotiation, a number of messages are exchanged between the first and second nodes. In step 704, the first or second node sends a start cipher or change cipher spec command to the second node and vice versa. When the cryptographic agent 316 in the first or second node sends the start cipher command, the agent 316 in step 708 commands the corresponding transport agent 312 to initiate transmit authentication and provides the agent 312 with the necessary information (typically a shared secret such as a transmit key and an identification of the message authentication code algorithm) to perform authentication operations on packets to be transmitted to the other node. When the cryptographic agent 316 in the first or second node receives the start cipher command from the other node in step 712, the agent 316 in step 716 commands the corresponding transport agent 312 to initiate receive authentication and provides the agent 312 with the necessary information (typically a shared secret such as a receive key (which may be different from the transmit key) and an identification of the message authentication code algorithm) to perform authentication operations on received packets. After step 708, is performed by the first or second node, data to be authenticated is provided to the corresponding transport agent 312 in step 720 for transmission to the other node. After steps 720 or 716 are performed, the cryptographic agent 316 in step 724 waits for receipt of data from the other node.

Figure 8A:
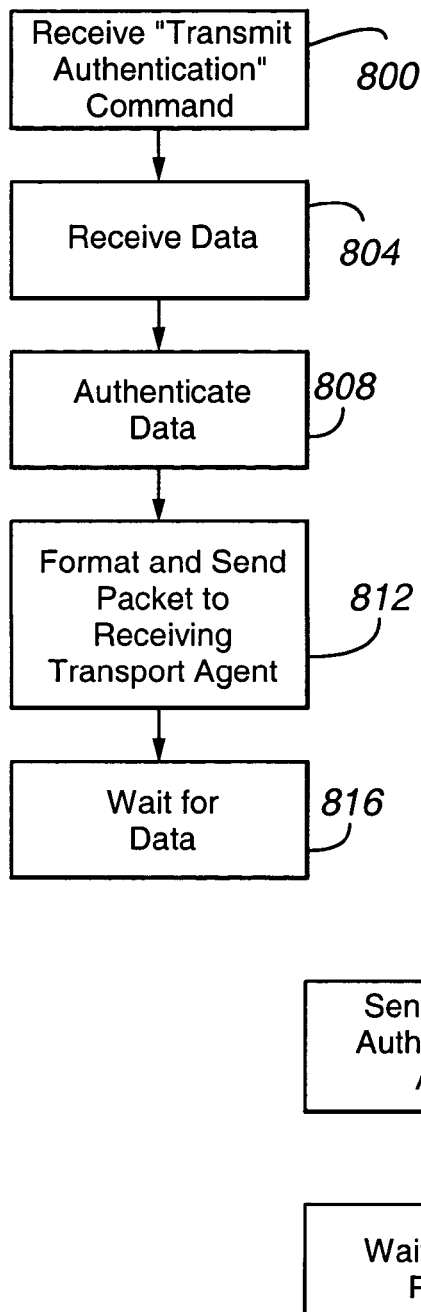
FIGS. 8A and B are flow charts depicting operations of the tracking agent.

FIGS. 8A and B depicts the operations performed by the transport agents in each node.

Referring to FIG. 8A in step 800, the transport agent 312 receives the transmit authentication command and authentication information. In response, the transport agent 312 enters into the transmit authentication mode (or first mode) in which an authentication option 500 is included in the option field 440 of each packet transmitted to the second node. In step 808, the transport agent 312 authenticates the data by generating an authentication option 500 to be included in the option field 440 of the packet header. As noted previously, in constructing the option 500 the transport agent 312 computes the message authentication code, with truncation to N bits, based on the pseudo-header of FIG. 6 and a shared secret. In step 812, the transport agent 312 formats and sends the packet to the transport agent of the other node. After performing step 312, the sending transport agent 312 in step 816 waits for more data from the cryptographic agent 316.

Figure 8B:
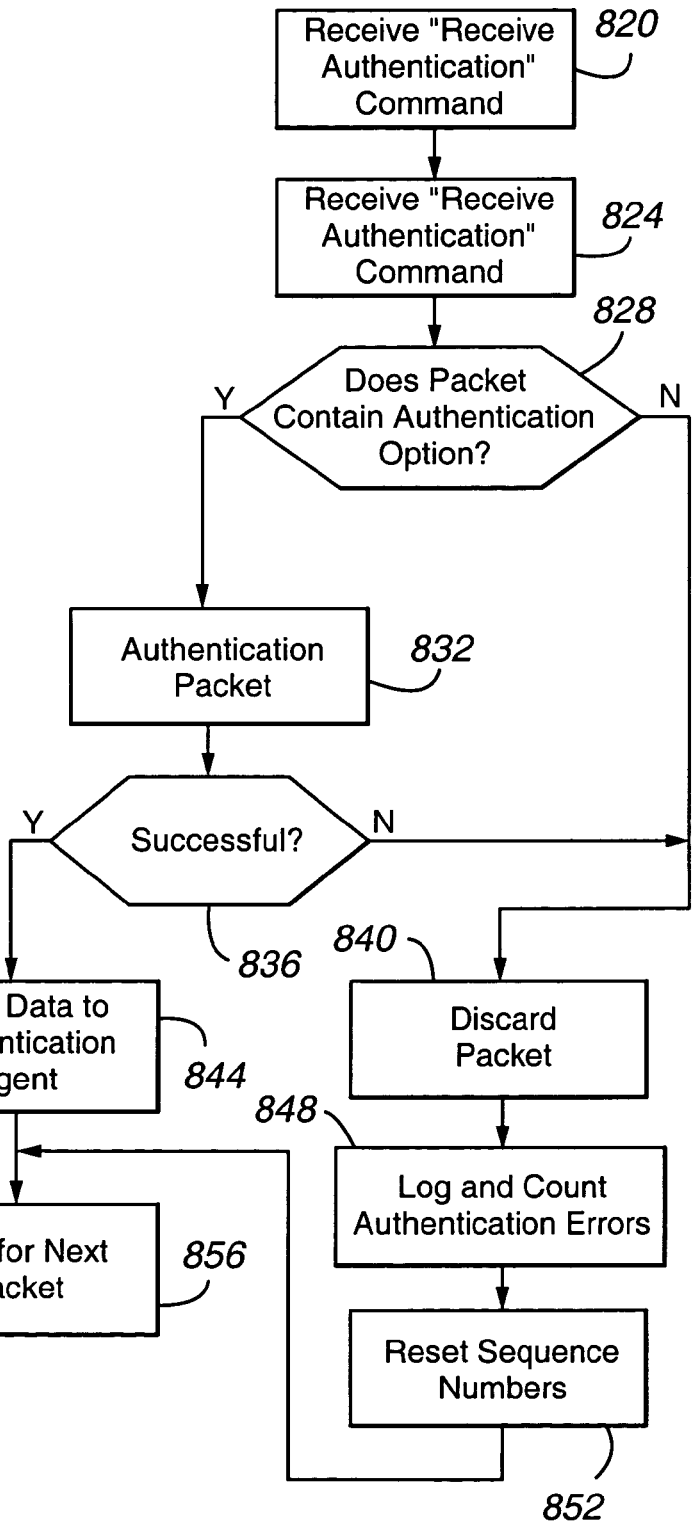

Referring now to FIG. 8B in step 820, the transport agent 312 receives the receive authentication command and authentication information. In response, the transport agent 312 enters into the receive authentication mode in which an authentication option 500 must be included in the option field 440 of each packet received by the second node. As will be appreciated, this mode can be entered for all received packets or just packets received from the second node. In step 824, the transport agent receives a packet from the sending transport agent in the other node. In decision diamond 828, the receiving transport agent 312 determines whether or not the received packet contains an authentication option. When the packet contains an authentication option, the transport agent 312, in step 832, authenticates the packet by computing a message authentication code, truncated by N bits, based on the packet pseudo-header and other contents and shared secret and comparing the computed message authentication code with the message authentication code in field 512 of the authentication option. In decision diamond 836, the transport agent 312 determines whether or not packet authentication was successful. When the message authentication codes are not identical, packet authentication is unsuccessful and the agent 312 proceeds to step 840 (discussed below). When the message authentication codes are identical, packet authentication is successful and the agent 312 proceeds to step 844. In step 844, the data contained in the packet is forwarded to the corresponding cryptographic agent 316 of the receiving node. When the packet does not contain an authentication option 500 in decision diamond 828 or when authentication is not successful in decision diamond 836, the transport agent 312 in step 840 discards the packet, logs and counts the authentication error in step 848, and not advance the sequence number in step 852. When the packet is discarded, the sending node will resend the packet because it never received an acknowledgment of successful receipt of the discarded packet, thereby greatly complicating and decreasing the ability of an DoS attacker. The agent 312 then proceeds to step 856 and waits for the next packet to be received.

Because the source and address fields and checksum field, which are manipulated by a proxy server, are set to zero (or zero bits) in the pseudo-header 600 upon which the message authentication code is based, firewall address and/or port translation does not interfere with the operation of security protocols, such as SSL and TLS, in the cryptographic agent 316.

As will be appreciated, the transport agent 312 is reset back to the first or no authentication mode in response to a stop cipher command (e.g., a next change cipher spec command or finished command) being received by the cryptographic agent 316. A stop authentication command is then sent by the receiving cryptographic agent to the corresponding cryptographic agent.

Because all packets transmitted in the transmit authentication mode and received in the receive authentication mode must include an authentication option, acknowledgment packets transmitted/received in these modes must contain authentication options in their headers. This prevents a DoS attacker from blocking or causing termination of the session by sending a false acknowledgment to the sending node.

A number of variations and modifications of the invention can be used. It would be possible to provide for some features of the invention without providing others.

For example in one alternative embodiment, the transport agent 312 can be implemented with protocols other than those set forth above. For example, such other protocols for the transport agent include other versions of TCP, UDP, Internet Control Message Protocol or ICMP, or Session Control Transport Protocol or SCTP. SCTP is chunk-based in data transmission and acknowledgment. One adaptation to SCTP is to define two new payload types and restrict the chunk contents. One payload type would be for the authenticated stream and the other for acknowledgments for that stream.

Likewise in other embodiments, the cryptographic agent can use any of a number of suitable secure protocols, such as IPSec, and the like.

In another alternative embodiment, the implementation of the authentication option can be not only in the transport layer header but also as a Bump in the Stack or BITS implementation between OSI Layers 3 and 4.

In yet another alternative embodiment, the authentication option is in a TCP/IP layer that corresponds to the OSI transport layer. For example, the authentication option can be in the host-to-host transport layer of TCP/IP.

Figure 6:
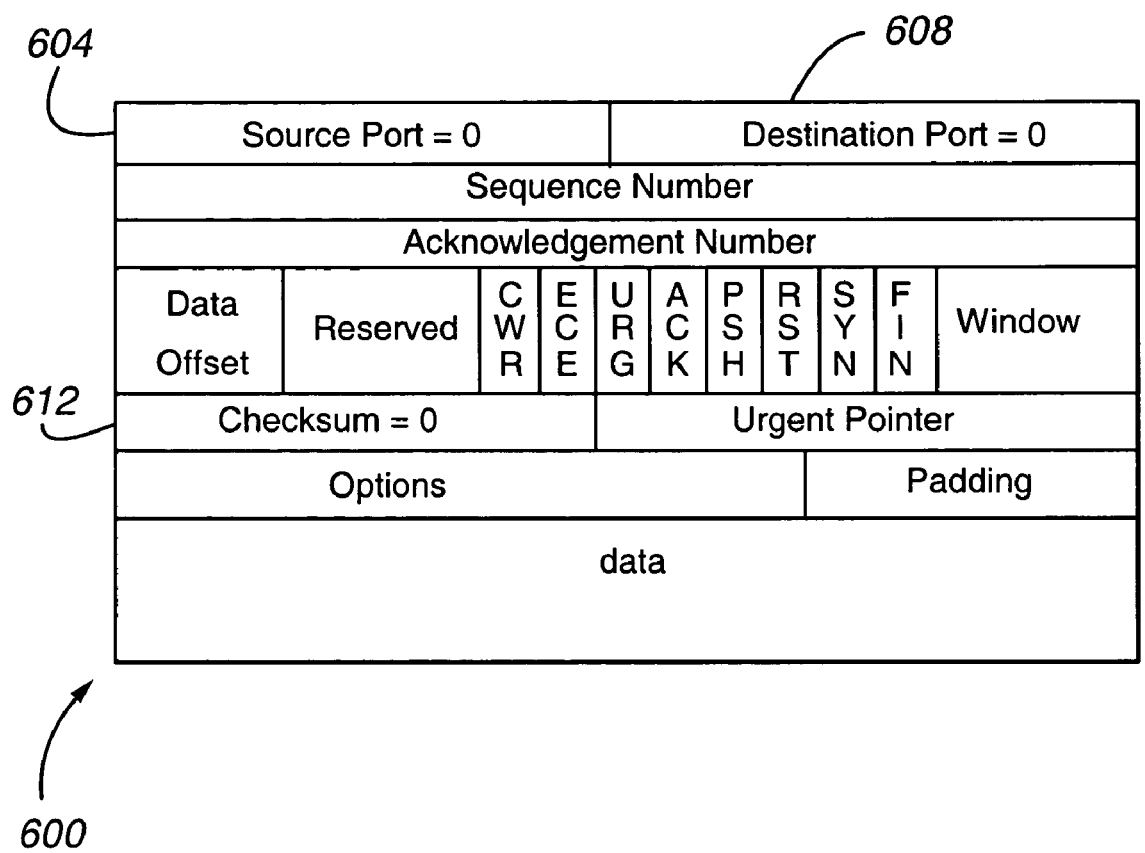
FIG. 6 is a block diagram of a pseudo-header for computing a message authentication code.

In yet a further alternative embodiment, the pseudoheader, which may or may not be defined by the OSI Layers 3, 4, 5, 6, and/or 7, represents only a portion of the header and/or payload, and may include one or more different fields to those shown in FIG. 6.

In another alternative embodiment, the transport agent and/or cryptographic agent or component thereof is embodied as a logic circuit, such as an Application Specific Integrated Circuit, in addition to or in lieu of software.

The present invention, in various embodiments, includes components, methods, processes, systems and/or apparatus substantially as depicted and described herein, including various embodiments, subcombinations, and subsets thereof Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
    (a) receiving, by a destination node and from a source node, a packet comprising a header that includes a first message authentication code and source port and checksum fields, the header having been altered by a firewall;
    (b) computing, by the destination node and over the packet, a second message authentication code; and
    (c) applying the following rules:
        (c1) when the first and second message authentication codes match, the packet is authenticated successfully; and
        (c2) when the first and second message authentication codes do not match, the packet is not authenticated successfully;
    wherein each of the first and second message authentication codes is computed by the source and destination nodes, respectively, based on values for the source port and checksum fields that are different from the values for the source port and checksum fields in the packet before and after alteration by the firewall.

2. The method of claim 1, wherein the first message authentication code is contained in an Open Systems Interconnect transport layer portion of the header.

3. The method of claim 2, wherein the first message authentication code is contained in an authentication option.

4. The method of claim 3, wherein the authentication option comprises an option indicator having a value associated with the authentication option, a length having a value associated with the length of the first message authentication code, and the first message authentication code, and wherein the first message authentication code is truncated to a selected number of bits.

5. The method of claim 2, wherein, in computing the first and second message authentication codes, the values for the source port, destination port, and checksum fields are independent of the corresponding values in the header.

6. The method of claim 1, wherein the first and second message authentication codes are computed based on values for members of a set of fields, the values being the same as the values for the members of the set of fields contained in the header, both before and after firewall alteration, and wherein the set of fields comprise a plurality of an urgent pointer flag, PSH flag, finished flag, acknowledgment flag, synchronize flag, reset flag, sequence number, acknowledgment number, data offset, window, options, and padding.

7. The method of claim 3, further comprising, after the receiving step:
    (d) in a first mode, discarding the packet when the packet header does not include the authentication option; and
    (e) in a second, different mode, discarding the packet when the packet header includes an authentication option, whether valid or invalid, wherein the computing and applying steps occur only in the first mode.

8. The method of claim 7, further comprising:
    (f) negotiating, by the source and destination nodes, protocol parameters over an insecure channel;
    (g) receiving a start cipher and/or change cipher spec command;
    (h) in response initiating receive authentication using a shared secret, wherein, in receive authentication, the first mode is performed; and
    (i) thereafter resetting to a no authentication mode in which the second mode is performed.

9. A computer comprising, in memory, software, wherein, when the software is executed by the computer, the computer performs the steps of claim 1.

10. A system, comprising:
    (a) an input operable to receive, from a source node, a packet comprising a header that includes a first message authentication code and source port and checksum fields, the header having been altered by a firewall;

(b) a transport agent, at a destination node, operable to compute, for the packet, a second message authentication code and apply the following rules:

(b1) when the first and second message authentication codes match, the packet is authenticated successfully; and (b2) when the first and second message authentication codes do not match, the packet is not authenticated successfully;

wherein each of the first and second message authentication codes is computed by the source and destination nodes, respectively, based on values for the source port and checksum fields that are different from the values for the source port and checksum fields in the packet before and after alteration by the firewall.

11. The system of claim 10, wherein the first message authentication code is contained in an Open Systems Interconnect transport layer portion of the header.

12. The system of claim 10, wherein the first message authentication code is contained in an authentication option.

13. The system of claim 12, wherein the authentication option comprises an option indicator having a value associated with the authentication option, a length having a value associated with the length of the first message authentication code, and the first message authentication code, and wherein the first message authentication code is truncated to a selected number of bits.

14. The system of claim 10, wherein, in computing the first and second message authentication codes, the values for the source port, destination port, and checksum fields are independent of the corresponding values in the header.

15. The system of claim 10, wherein the first and second message authentication codes are computed based on values for members of a set of fields, the values being the same as the values for the members of the set of fields contained in the header, both before and after firewall alteration, and wherein the set of fields comprise a plurality of an urgent pointer flag, PSH flag, finished flag, acknowledgment flag, synchronize flag, reset flag, sequence number, acknowledgment number, data offset, window, options, and padding.

16. The system of claim 10, wherein the transport agent:
in a first mode, discarding the packet when the packet header does not include the authentication option; and
in a second, different mode, discarding the packet when the packet header includes an authentication option, whether valid or invalid, wherein the computing and applying steps occur only in the first mode.

17. A method, comprising:
(a) generating, by a source node, a packet, the packet comprising a header that includes a first message authentication code and source port and checksum fields; and
(b) altering, by a firewall, the packet header;
wherein a destination node authenticates the packet by computing a second message authentication code; and
wherein each of the first and second message authentication codes is computed by the source and destination nodes, respectively, based on values for the source port and checksum fields that are different from the values for the source port and checksum fields in the packet before and after alteration by the firewall.

18. The method of claim 17, wherein the first message authentication code is contained in an Open Systems Interconnect transport layer portion of the header.

19. The method of claim 17, wherein the first message authentication code is contained in an authentication option.

20. The method of claim 19, wherein the authentication option comprises an option indicator having a value associated with the authentication option, a length having a value associated with the length of the first message authentication code, and the first message authentication code, and wherein the first message authentication code is truncated to a selected number of bits.

21. The method of claim 17, wherein, in computing the first and second message authentication codes, the values for the source port, destination port, and checksum fields are independent of the corresponding values in the header.

22. The method of claim 17, wherein the first and second message authentication codes are computed based on values for members of a set of fields, the values being the same as the values for the members of the set of fields contained in the header, both before and after firewall alteration, and wherein the set of fields comprise a plurality of an urgent pointer flag, PSH flag, finished flag, acknowledgment flag, synchronize flag, reset flag, sequence number, acknowledgment number, data offset, window, options, and padding.

23. The method of claim 17, further comprising, after the receiving step:
(c) in a first mode, generating the first message authentication code and locating the first message authentication code in an authentication option in a selected packet header; and
(d) in a second, different mode, not setting the authentication option in the selected packet header.

24. The method of claim 23, further comprising:
(e) negotiating, by the source and destination nodes, protocol parameters over an insecure channel;
(f) initiating transmit authentication using a shared secret, wherein, in transmit authentication, the first mode is performed; and
(g) thereafter resetting to a no authentication mode in which the second mode is performed.

25. A computer comprising, in memory, software, wherein, when the computer executes the software, the computer performs the steps of claim 17.

26. A method, comprising:
(a) receiving, by a destination node and from a source node, a packet comprising a header that includes first and second message authentication codes and source port and checksum fields, the header having been altered by a firewall;
(b) computing, by the destination node and over the packet, a third message authentication code; and
(c) applying the following rules:
(c1) when the first and third message authentication codes match, the packet is authenticated successfully; and
(c2) when the first and third message authentication codes do not match, the packet is not authenticated successfully;
wherein the first and third message authentication codes are computed by the source and destination nodes, respectively, and exclude values for the source port and checksum fields.

27. The method of claim 26, wherein the first message authentication code is contained in an Open Systems Interconnect ("OSI") transport layer portion of the header and the second message authentication code is contained in an authentication header used between OSI layers 3 and 4.

28. The method of claim 26, wherein the first message authentication code is contained in an authentication option.

29. The method of claim 28, wherein the authentication option comprises an option indicator having a value associated with the authentication option, a length having a value associated with the length of the first message authentication code, and the first message authentication code, and wherein the first message authentication code is truncated to a selected number of bits.

30. The method of claim 26, wherein, in computing the first and third message authentication codes, the value for the destination port is excluded.

31. The method of claim 26, wherein the first and third message authentication codes are computed based on values for members of a set of fields, the values being the same as the values for the members of the set of fields contained in the header, both before and after firewall alteration, and wherein the set of fields comprise a plurality of an urgent pointer flag, PSH flag, finished flag, acknowledgment flag, synchronize flag, reset flag, sequence number, acknowledgment number, data offset, window, options, and padding.

32. The method of claim 26, further comprising, after the receiving step:
(d) in a first mode, discarding the packet when the packet header does not include the authentication option; and
(e) in a second, different mode, discarding the packet when the packet header includes an authentication option, whether valid or invalid, wherein the computing and applying steps occur only in the first mode.

33. The method of claim 32, further comprising:
(f) negotiating, by the source and destination nodes, protocol parameters over an insecure channel;
(g) receiving a start cipher and/or change cipher spec command;
(h) in response initiating receive authentication using a shared secret, wherein, in receive authentication, the first mode is performed; and
(i) thereafter resetting to a no authentication mode in which the second mode is performed.

34. A computer comprising software, wherein, when the computer executes the software, the computer performs the steps of claim 26.

35. A system, comprising:
(a) an input to receive, from a source node, a packet comprising a header that includes first and second message authentication codes and source port and checksum fields, the header having been altered by a firewall;
(b) a transport agent, at a destination node, operable to compute, for the packet, a third message authentication code and apply the following rules:
(b1) when the first and third message authentication codes match, the packet is authenticated successfully; and
(b2) when the first and third message authentication codes do not match, the packet is not authenticated successfully;
wherein the first and third message authentication codes are computed by the source and destination nodes, respectively, and exclude values for the source port and checksum fields.

36. The system of claim 35, wherein the first message authentication code is contained in an Open Systems Interconnect ("OSI") transport layer portion of the header and the second message authentication code is contained in an authentication header used between OSI layers 3 and 4.

37. The system of claim 35, wherein the first message authentication code is contained in an authentication option.

38. The system of claim 37, wherein the authentication option comprises an option indicator having a value associated with the authentication option, a length having a value associated with the length of the first message authentication code, and the first message authentication code, and wherein the first message authentication code is truncated to a selected number of bits.

39. The system of claim 35, wherein, in computing the first and third message authentication codes, the value for the destination port is excluded.

40. The system of claim 35, wherein the first and third message authentication codes are computed based on values for members of a set of fields, the values being the same as the values for the members of the set of fields contained in the header, both before and after firewall alteration, and wherein the set of fields comprise a plurality of an urgent pointer flag, PSH flag, finished flag, acknowledgment flag, synchronize flag, reset flag, sequence number, acknowledgment number, data offset, window, options, and padding.

41. The system of claim 35, further comprising, after the receiving step:
(c) in a first mode, discarding the packet when the packet header does not include the authentication option; and
(d) in a second, different mode, discarding the packet when the packet header includes an authentication option, whether valid or invalid, wherein the computing and applying steps occur only in the first mode.

42. The system of claim 41, further comprising:
(e) negotiating, by the source and destination nodes, protocol parameters over an insecure channel;
(f) receiving a start cipher and/or change cipher spec command;
(g) in response initiating receive authentication using a shared secret, wherein, in receive authentication, the first mode is performed; and
(h) thereafter resetting to a no authentication mode in which the second mode is performed.

* * * * *